United States Patent
Nakano et al.

[11] Patent Number: 6,110,839
[45] Date of Patent: Aug. 29, 2000

[54] METHOD OF PURIFYING ALKALINE SOLUTION AND METHOD OF ETCHING SEMICONDUCTOR WAFERS

[75] Inventors: Masami Nakano, Vancouver, Wash.; Isao Uchiyama, Fukushima-ken, Japan; Toshio Ajito, Fukushima-ken, Japan; Hideo Kudo, Fukushima-ken, Japan

[73] Assignee: Shin-Etsu Handotai Co., Ltd., Tokyo, Japan

[21] Appl. No.: 08/703,645

[22] Filed: Aug. 27, 1996

[30] Foreign Application Priority Data

Aug. 29, 1995 [JP] Japan ................................ 7-220350
Aug. 20, 1996 [JP] Japan ................................ 8-218503

[51] Int. Cl.⁷ .................................................... B44C 1/22
[52] U.S. Cl. ................................ 438/753; 216/93; 216/99
[58] Field of Search ........................ 216/93, 99; 438/753

[56] References Cited

U.S. PATENT DOCUMENTS

| | | | |
|---|---|---|---|
| 4,859,280 | 8/1989 | Lowry et al. | 438/753 |
| 5,348,617 | 9/1994 | Brayman | 438/753 |
| 5,470,421 | 11/1995 | Nakada et al. | 216/93 |

FOREIGN PATENT DOCUMENTS

| | | |
|---|---|---|
| 53-009295 | 1/1978 | Japan . |
| 55-047221 | 4/1980 | Japan . |
| 55-074142 | 6/1980 | Japan . |
| 3-075216 | 3/1991 | Japan . |

*Primary Examiner*—Timothy M. Speer
*Attorney, Agent, or Firm*—Armstrong, Westerman, Hattori, McLeland & Naughton

[57] ABSTRACT

A method of purifying an alkaline solution includes dissolving metallic silicon and/or silicon compounds in the alkaline solution and non-ionizing metallic ions in the alkaline solution with reaction products generated when the metallic silicon and/or silicon compounds are dissolved therein. This purifying method is capable of remarkably decreasing metallic ions in the alkaline solution at a low-cost by an easy operation. A method of etching semiconductor wafers includes purifying an alkaline solution by non-ionizing metallic ions in the alkaline solution and etching the semiconductor wafers by using the purified alkaline solution. According to this etching method, the metallic contamination level due to the etching of the semiconductor wafers is greatly decreased, there being neither deterioration in the wafer quality nor deterioration in the characteristic of the semiconductor device.

26 Claims, 14 Drawing Sheets

METHOD OF PURIFYING ALKALINE SOLUTION AND METHOD OF ETCHING SEMICONDUCTOR WAFERS

BACKGROUND OF THE INVENTION

1. Field of the Invention

The present invention relates to a method of purifying an alkaline solution by effectively non-ionizing (neutralizing) or removing metallic impurity ions therein and a method of etching semiconductor wafers with a purified alkaline solution without deteriorating the quality thereof.

2. Description of the Related Art

Generally, the manufacturing method of semiconductor wafers includes several steps: a slicing step to obtain wafers of thin disc shape by slicing a single crystal ingot formed by pulling the crystal in a crystal pulling machine; a chamfering step to chamfer a peripheral edge portion of the wafer obtained by the previous step to prevent cracking or breakage of the wafer; a lapping step to flatten the surface of the chamfered wafer by lapping it; an etching step to remove processing damage of the chamfered and lapped wafer; a polishing process to polish the surface of the etched wafer; and a cleaning step for cleaning the polished wafer to remove the polishing agent or dust particles from its surface.

There are two methods to etch a silicon wafer namely, an acid etching method using an acid etching solution of a mixed acid or the like and an alkaline etching method using an alkaline etching solution of NaOH or the like. In the acid etching, the etching speed is fast and thus it is difficult to uniformly etch the wafer without deteriorating the flatness of the wafer. Therefore, alkaline etching which uses a sodium hydroxide solution, a potassium hydroxide solution and an alkyl ammonium hydroxide solution etc. is predominantly employed because alkaline etching does not deteriorate the flatness of the wafer due to its uniform etching even if its etching speed is slower.

In the alkaline etching of the semiconductor wafer, an available industrial alkaline solution of high metallic impurity concentration is typically used as it is. A lot of metallic impurities are included in the industrial grade alkaline solution which is generally used. Even an electronic industrial grade alkaline solution used for etching semiconductor wafers contains metallic impurities of several tens of parts per billion (ppb) to several parts per million (ppm).

There are nickel, chromium, iron and copper metallic impurities included in this alkaline solution. A lot of nickel, chromium and iron, which are raw materials of stainless steels used in the manufacturing process of the alkaline solution, are especially included.

Conventionally, it was thought that these metallic impurities contaminate only the surface of the semiconductor wafer when the wafer was etched with an alkaline solution which contained these metallic impurities. It was assumed that metallic impurities, which adhere to the surface of the wafer, are removed enough by cleaning the wafer with an acid solution. Accordingly, it was thought that the existence of metallic impurities in the alkaline etching solution did not affect the wafer quality.

The present inventors researched the alkaline etching process over many years. Recently the inventors discovered, contrary to traditional understanding, that metallic ions of the metallic impurities such as copper and nickel, which exist in the alkaline etching solution, diffuse deep inside of the wafer while etching. The result of this phenomena is that the wafer quality is deteriorated and the resulting semiconductor device made of the wafer is remarkably degraded.

One might think to use the alkaline solution of high purity to prevent deterioration in the wafer quality due to the alkaline etching solution. However, an alkaline solution of high purity is the extremely expensive analysis grade alkaline solution. It does not make economical sense to employ an analysis grade alkaline solution for industrial use.

SUMMARY OF THE INVENTION

The inventors found by extended research that metallic impurity ions in an alkaline solution are non-ionized (neutralized) by an easy technique and further, semiconductor wafers etched with the alkaline solution in which metallic impurity ions were neutralized or removed are not deteriorated even in the physical existence of the metallic impurities. The present invention was accomplished on the basis of this discovery.

It is an object of the present invention to provide a novel method of purifying an alkaline solution which enables metallic impurities, especially metallic ions in the alkaline solution to be neutralized at a low-cost and extremely efficiently as well as a new method of etching semiconductor wafers without deteriorating the quality thereof by using the purified alkaline solution.

To attain the foregoing object, in one aspect, the present invention provides a method of purifying an alkaline solution which comprises the steps of dissolving metallic silicon and/or silicon compounds in an alkaline solution and neutralizing metallic ions in the alkaline solution by reaction products such as hydrogen and silicates generated when the metallic silicon and/or silicon compounds are dissolved therein.

As the aforementioned metallic silicon, polysilicon and single crystal silicon may be used. These can be used in a mixture or alone. As the aforementioned silicon compounds silica and silicates can be used together or alone. For these metallic silicon and silicon compounds, it is preferable to use products of as high purity as possible within the range commercially practicable.

There is no special limitation for the amount of the aforementioned metallic silicon dissolved in solution as long as the effect of this invention is achieved. A suitable amount is 0.2 g/liter or more. When the amount dissolved is too small, the resulting effects of the solution on the wafer are not enough. When the amount dissolved is too large, it becomes economically disadvantageous.

Moreover, the amount of the aforementioned silicon compounds dissolved does not have a special limitation as long as the effect of this invention is achieved. The amount of dissolved Si included in the dissolved silicon compound is suitably 5 g/liter or more. When the amount dissolved is too small, the resulting effects of the solution on the wafer are not enough. When this amount dissolved is too large, it becomes economically disadvantageous.

In another aspect, the present invention provides a method of purifying an alkaline solution which comprises the steps of dissolving hydrogen gas in an alkaline solution and neutralizing metallic ions in the alkaline solution by reducing them using the dissolved hydrogen gas.

In a third preferred form of the present invention, there is provided a method of etching semiconductor wafers which comprises the steps of purifying an alkaline solution by neutralizing metallic ions in the alkaline solution and etching semiconductor wafers by using the purified alkaline solution. The purification processing of the alkaline solution may be conducted by the previously described various methods of purifying the alkaline solution.

In a fourth preferred embodiment of the present invention, there is provided a method of etching semiconductor wafers which comprises the steps of removing metallic ions in an alkaline solution and etching semiconductor wafers with the alkaline solution in which metallic ions have been removed.

The removal processing of the metallic ions can be carried out with ion exchange resins, preferably chelate resins. There is no special limitation of the alkaline solution used in this invention. There may be a sodium hydroxide solution or a potassium hydroxide solution conventionally and widely used as an alkaline etching solution of semiconductor wafers.

In this invention, there are nickel ions, copper ions, chromium ions, iron ions, etc. as impurity metallic ions to be removed from the alkaline solution. Among these ions, it is important to semiconductor wafer quality to neutralize or to remove the nickel ions and the copper ions with a large diffusion speed in silicon single crystal.

A metallic ion concentration in an alkaline solution used in etching semiconductor wafers according to the present invention may be suitably limited to 50 ppb or less, preferably 20 ppb or less, more preferably 10 ppb or less. With these concentration limitations, the achievement of the effect of this invention is good.

The purification of the alkaline solution of this invention connotes that impurity metallic ions in the alkaline solution are neutralized or removed. Even if solid impurity metals exist physically in the alkaline solution, unless they exist in the state of metallic ions, the alkaline solution can correspond to the state of the purified alkaline solution according to this invention. That is, the deterioration of the semiconductor wafers due to the etching thereof does not occur even if solid impurity metals exist in an alkaline solution as long as they do not exist as impurity metallic ions. On the contrary, when the solid impurity metals do not exist at all but exist as metallic ions in the alkaline solution, if the semiconductor wafers are etched with this alkaline solution, deterioration in the wafer quality is caused.

The present invention is based on three inventive findings: first, the existence of impurity metallic ions in an alkaline solution greatly affects deterioration of semiconductor wafer quality due to alkaline etching; second, purification such as the neutralizing of the metallic ions in the alkaline solution can be carried out by a very easy technique; and third, when semiconductor wafers are etched by using the purified alkaline solution deterioration of quality thereof does not occur.

The above and other objects, features and advantages of the present invention will become manifest to those skilled in the art upon making reference to the detailed description and the accompanying sheets of drawings.

DETAILED DESCRIPTION OF THE INVENTION

The present invention will be described below in greater detail by way of the following examples which should be construed as illustrative rather than restrictive.

EXAMPLE 1

(purification of a sodium hydroxide solution with polysilicon)

Figure 1:
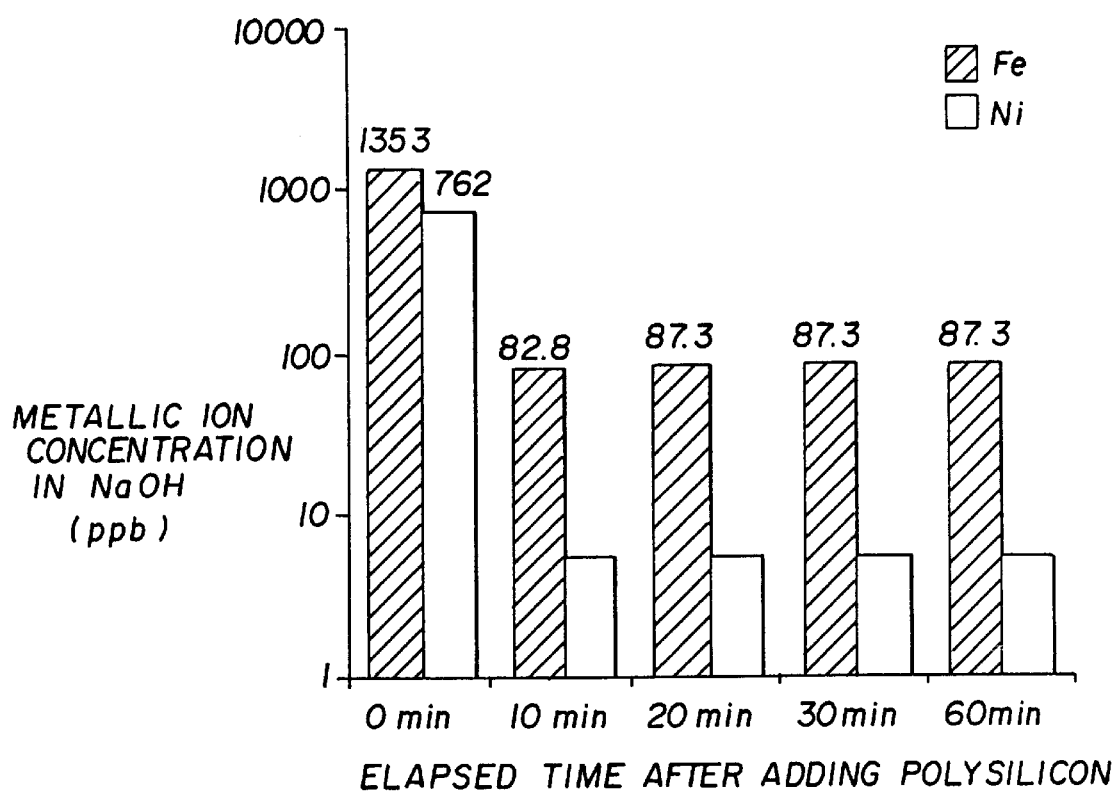
FIG. 1 is a graph showing the relation between an iron ion concentration and a nickel ion concentration in the sodium hydroxide solution and the elapsed time after adding polysilicon thereto in Example 1.

To a sodium hydroxide solution (45%, 20 liters and 80° C.), 200 g of semiconductor grade granular polysilicon was added. Before and after adding the polysilicon 10 minutes later, 20 minutes later, 30 minutes later and 60 minutes later, 10 ml of the sodium hydroxide solution diluted to 45 times was sampled, respectively. Then an iron ion concentration and a nickel ion concentration thereof were analyzed by an ion-exchange chromatography. The results of the analyses are shown in FIG. 1. As is apparent from the results of FIG. 1, both the iron ion concentration and the nickel ion concentration were decreased and especially the latter was remarkably decreased or neutralized. In FIGS. 1–3, 5, 6 and 11, "N.D." means that the measured data have been under detection limit.

EXAMPLE 2
(purification of a sodium hydroxide solution with single crystal silicon)

Figure 2:
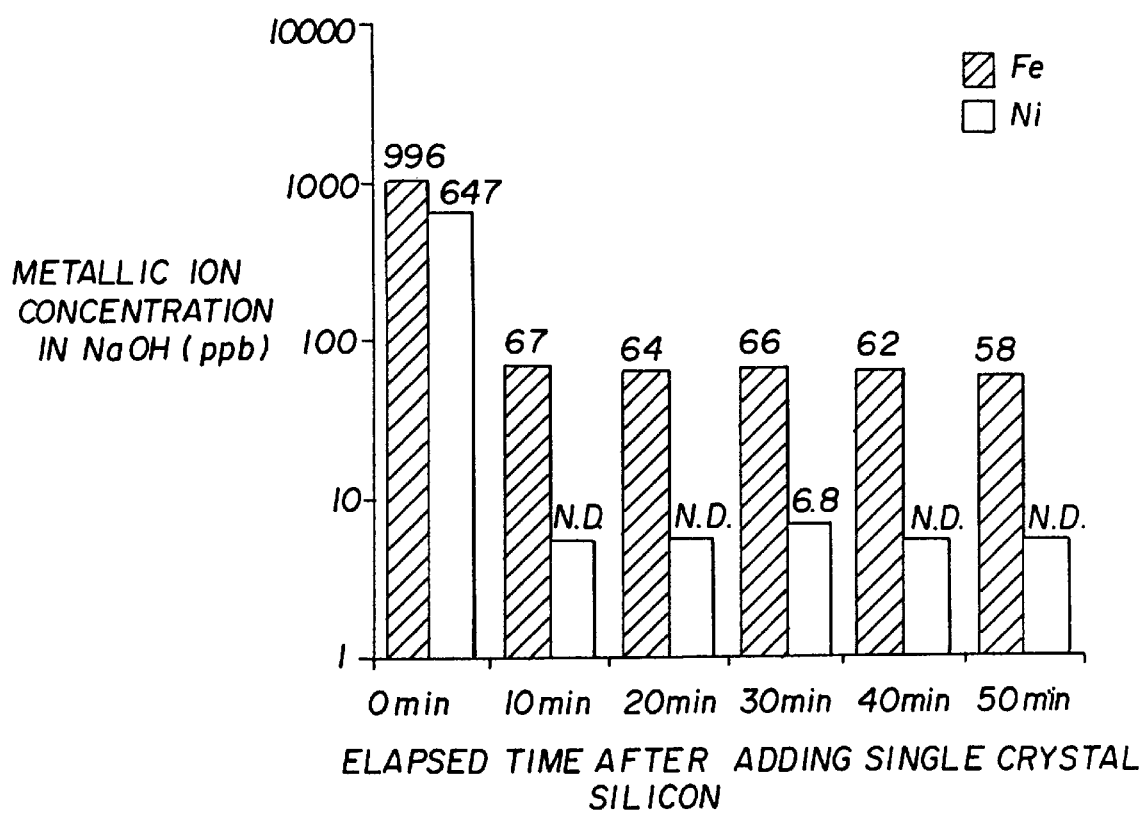
FIG. 2 is a graph showing the relation between an iron ion concentration and a nickel ion concentration in the sodium hydroxide solution and the elapsed time after adding single crystal silicon thereto in Example 2.

To a sodium hydroxide solution (45%, 20 liters and 80° C.), 10 sheets of single crystal silicon wafers having 200 mm ø were added. Before and after adding the wafers 10 minutes later, 20 minutes later, 30 minutes later and 60 minutes later, 10 ml of the hydroxide sodium solution diluted to 45 times was sampled, respectively. Then an iron ion concentration and a nickel ion concentration thereof were analyzed by an ion-exchange chromatography. The results of the analyses are shown in FIG. 2. As is apparent from the results of FIG. 2, both the iron ion concentration and the nickel ion concentration were decreased and especially the latter was remarkably decreased or neutralized.

EXAMPLE 3
(purification of a sodium hydroxide solution with polysilicon)

Figure 3:
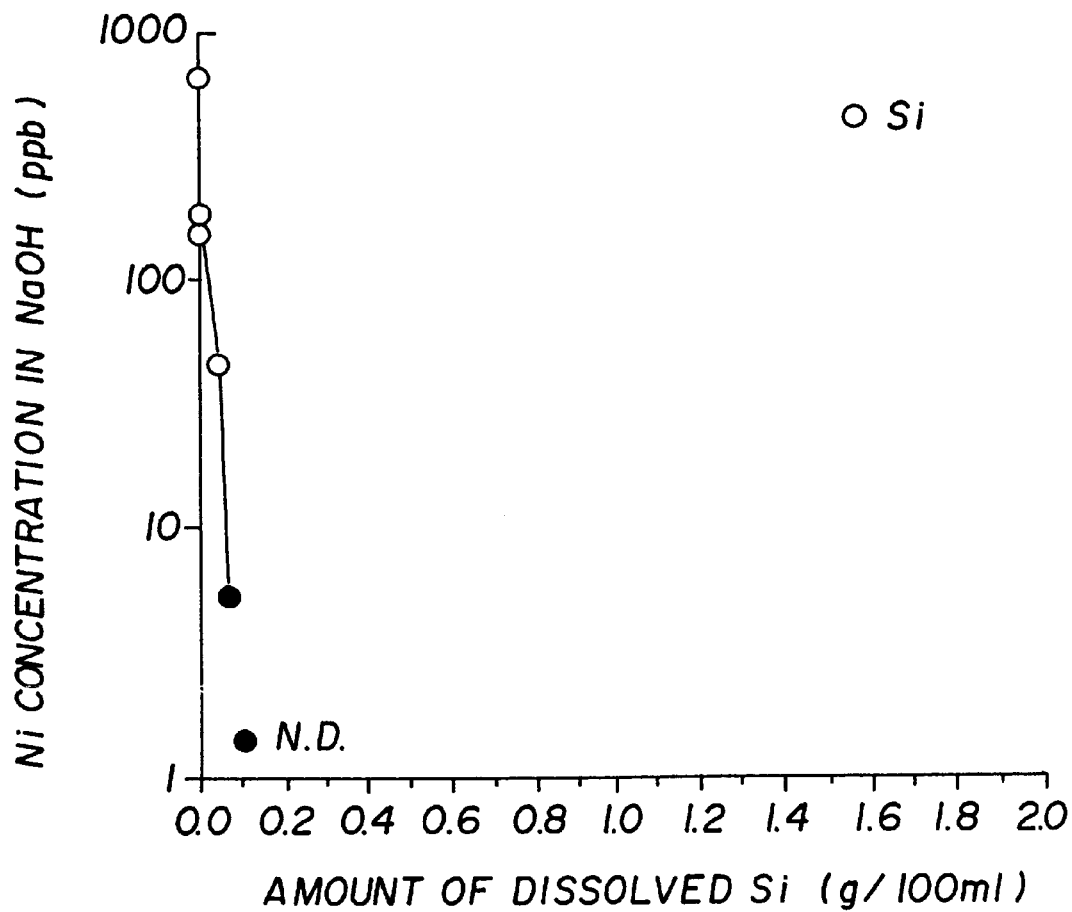
FIG. 3 is a graph showing the relation between the amount of dissolved polysilicon and a nickel ion concentration in the sodium hydroxide solution in Example 3.

To a sodium hydroxide solution (45%, 20 liters and 80° C.), 200 g of semiconductor grade granular polysilicon was added. Before and after adding the polysilicon 1 minute later, 10 ml of the sodium hydroxide solution diluted to 45 times was sampled, respectively, and the added polysilicon was removed from the solution. Then a nickel ion concentration thereof was analyzed by an ion-exchange chromatography. The collected polysilicon was weighed and the amount dissolved thereof was calculated. The same procedure as mentioned above was repeated after adding polysilicon 3 minutes later, 5 minutes later and 10 minutes later, respectively. The results of the analyses are shown in FIG. 3. As is apparent from the results of FIG. 3, the amount of the nickel ions in the sodium hydroxide solution decreased rapidly only by dissolving a small amount of polysilicon.

EXAMPLE 4
(purification of a sodium hydroxide solution with silica)

Figure 4:
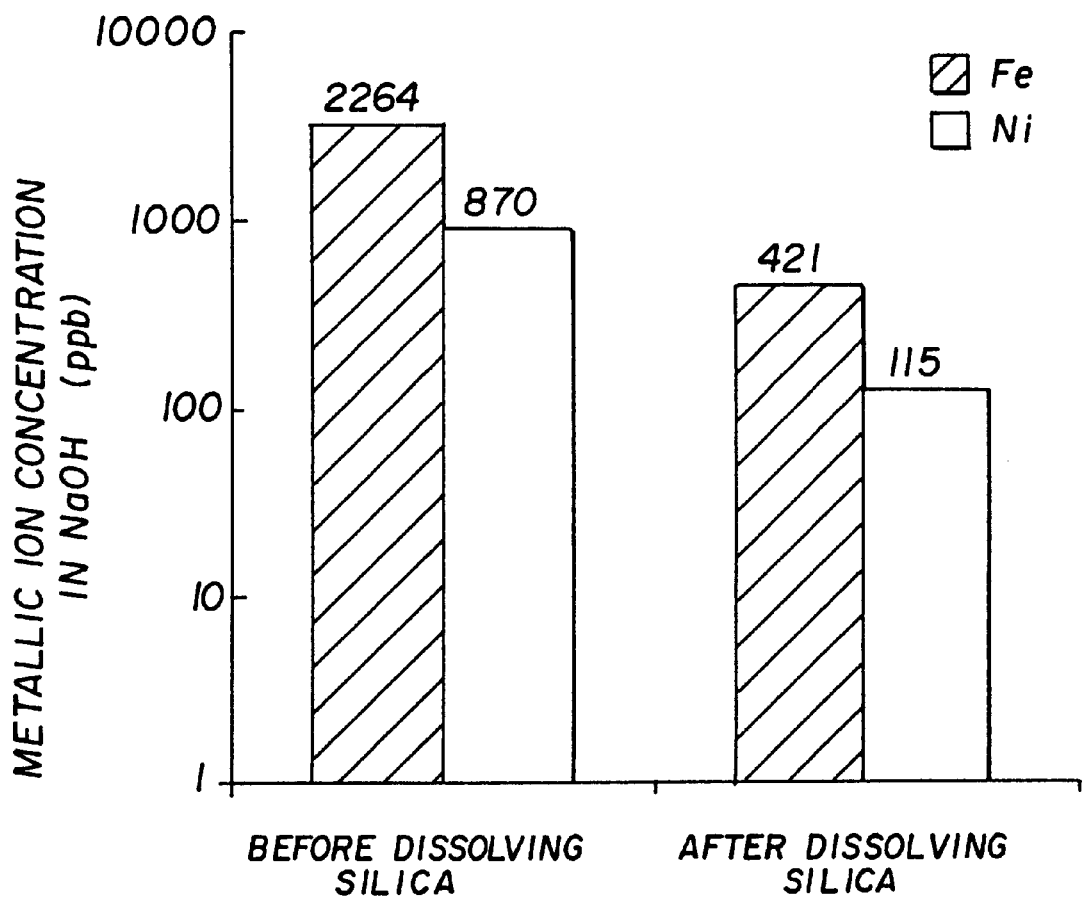
FIG. 4 is a graph showing the relation between an iron ion concentration and a nickel ion concentration in the sodium hydroxide solution before and after dissolving silica in Example 4.

To a sodium hydroxide solution (45%, 2 liters and 25° C.), 1 wt % of silica was added. Before and after adding the silica, 10 ml of the sodium hydroxide solution diluted to 45 times was sampled, respectively. Then a nickel ion concentration and an iron ion concentration thereof were analyzed by an ion-exchange chromatography. The results of the analyses are shown in FIG. 4. As is apparent from the results of FIG. 4, both the iron ion concentration and the nickel ion concentration were remarkably decreased by adding the silica.

EXAMPLE 5
(purification of a sodium hydroxide solution with silicate)

Figure 5:
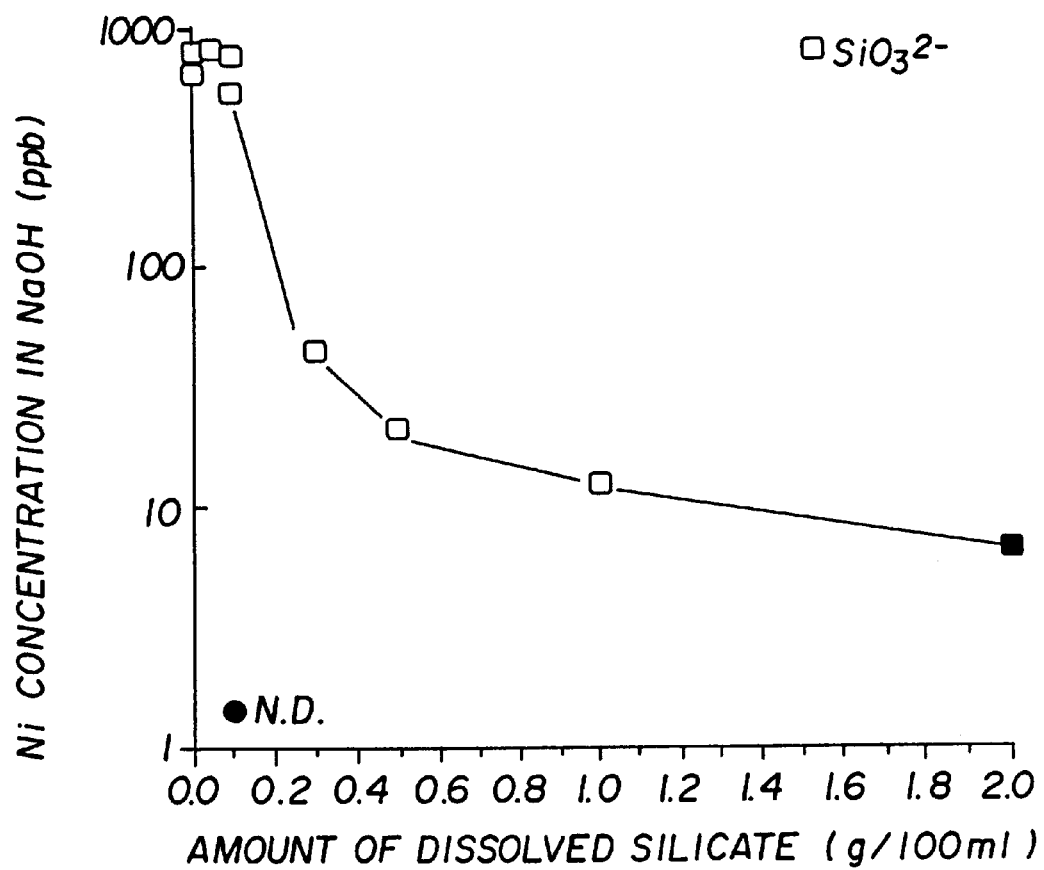
FIG. 5 is a graph showing the relation between the amount of dissolved silicate and a nickel ion concentration in the sodium hydroxide solution in Example 5.

To a sodium hydroxide solution (45%, 2 liters and 25° C.), sodium silicate ($Na_2SiO_3$) in respective concentrations shown in FIG. 5 was added. 10 ml of the sodium hydroxide solution diluted to 45 times was sampled, respectively, and then a nickel ion concentration and an iron ion concentration thereof were analyzed by an ion-exchange chromatography. The results of the analysis are shown in FIG. 5, As is apparent from the results of FIG. 5, the nickel ion concentration was remarkably decreased as the silicate ion ($SiO_3^{2-}$) concentration in the sodium hydroxide solution goes up by adding the silicate.

EXAMPLE 6
(purification of a sodium hydroxide solution with hydrogen gas)

Figure 6:
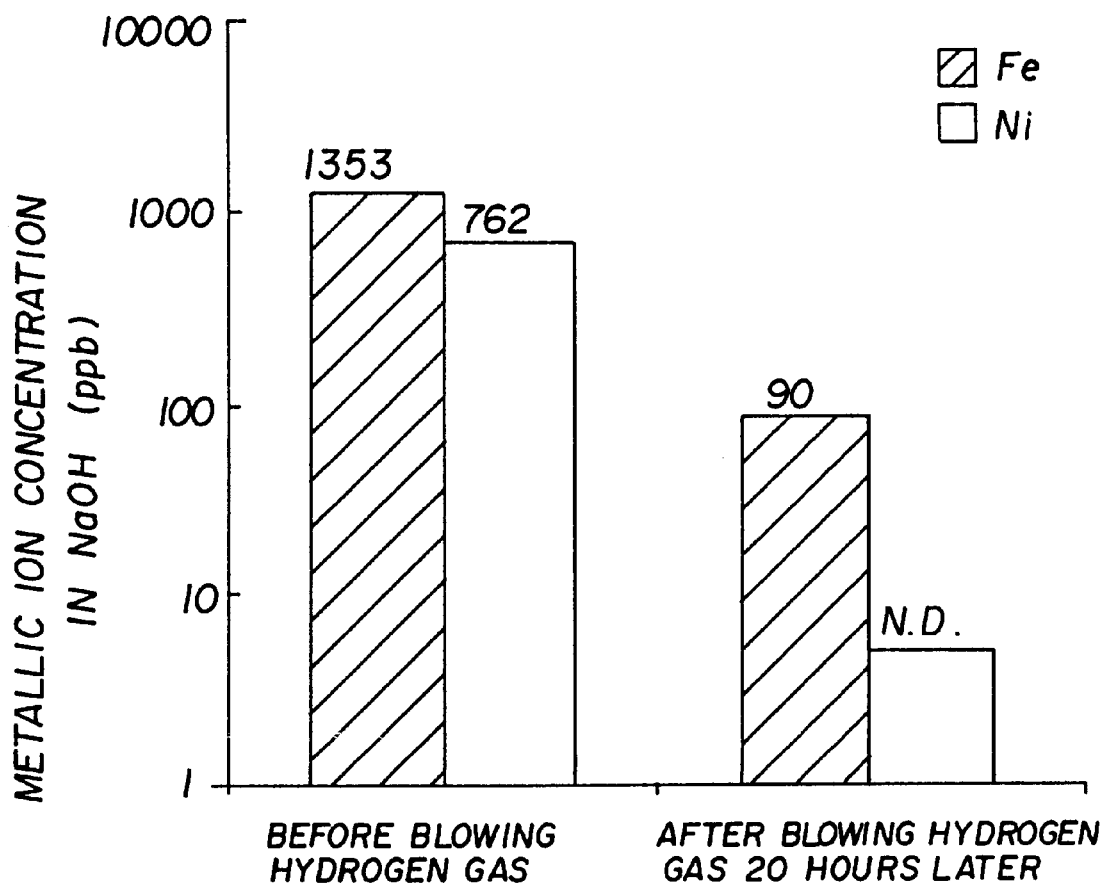
FIG. 6 is a graph showing the relation between hydrogen gas blowing and an iron ion concentration and a nickel ion concentration in the sodium hydroxide solution in Example 6.

Into a sodium hydroxide solution (45%, 20 liters and 80° C.), hydrogen gas was blown at a rate of 0.5 liter/min. Before and after blowing the hydrogen gas 20 hours later, 10 ml of the sodium hydroxide solution diluted to 45 times was sampled, respectively, and then a nickel ion concentration and an iron ion concentration thereof were analyzed by an ion-exchange chromatography. The results of the analyses are shown in FIG. 6. As is apparent from the results of FIG. 6, both the iron ion concentration and the nickel ion concentration were decreased and especially the latter was excellently removed.

EXAMPLE 7
(etching a wafer by a sodium hydroxide solution purified with polysilicon)

To a sodium hydroxide solution (45%, 20 liters and 80° C.) 200 g of semiconductor grade granular polysilicon was added. After leaving the solution for one hour, a sample wafer was etched by using the solution and the contamination level of the wafer was examined. This experiment was conducted under the following condition.

Experiment Condition:
  Sample wafer; Czochralski-grown p-type, <100>-oriented, 0.005–0.010 Ωcm, 200 mm-diameter, lapped silicon wafers
  Alkaline etching with a sodium hydroxide solution (45% aqueous solution containing dissolved polysilicon, 80° C. and 10 minutes)
  Cleaning with water (25° C. and 3 minutes)
  Cleaning with a solution of hydrochloric acid, hydrogen peroxide and water (80° C. and 3 minutes)
  Cleaning with water (25° C. and 3 minutes)
  Drying with IPA vapor (81.5° C. and 1 minute)
  Experiment tank (common in the above treatments)
    Size (mm): 280×280×300 H
    Capacity: 20 liters
    Materials: Quart
  Composition of the solution of hydrochloric acid, hydrogen peroxide and water; Hydrochloric acid solution: Hydrogen peroxide water: Water=1:1:10 (volume ratio) (Use a 36 weight percent hydrochloric acid solution and a 30 weight percent hydrogen peroxide water)

The wafer etched according to the above-mentioned condition was evaluated as follows: One side of the etched wafer was subjected to sand blasting and then thermal oxidation at 600° C. The thermal oxide film on the side of the wafer sand blasted was vapor phase decomposed with hydrofluoric acid vapor. The decomposed materials were collected by using a solution containing hydrofluoric acid. The collected materials were analyzed by ICP-MS (inductively coupled plasma mass spectrometer).

Figure 7:
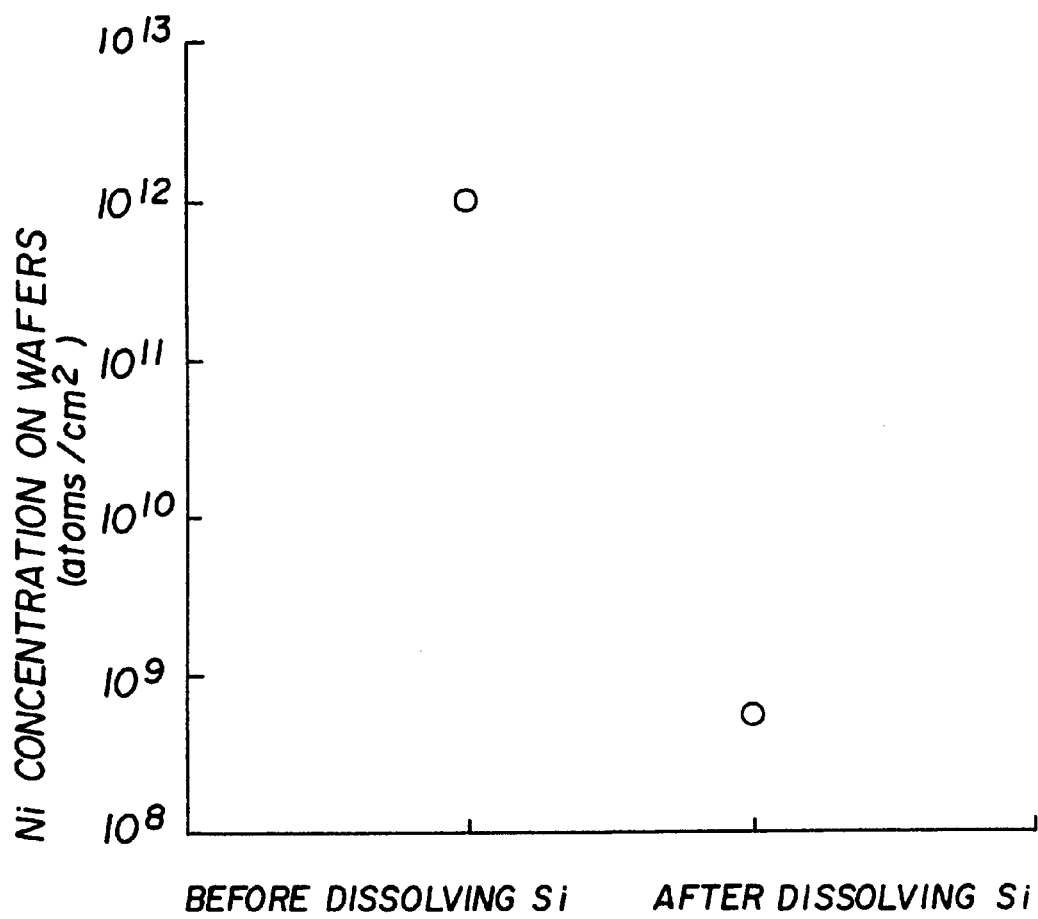
FIG. 7 is a graph showing a nickel concentration on a wafer which was etched by a sodium hydroxide solution purified with polysilicon in Example 7 and that on another wafer which was etched by an unpurified sodium hydroxide solution.

The result of the analysis is shown in FIG. 7 together with one obtained in the case that a sample wafer was etched with a sodium hydroxide solution without adding polysilicon. As is apparent from the results of FIG. 7, the nickel ion concentration on the wafer etched with the sodium hydroxide solution with adding polysilicon was remarkably decreased.

EXAMPLE 8
(etching a wafer by a sodium hydroxide solution purified with single crystal silicon)

To a sodium hydroxide solution (45%, 20 liters and 80° C.), 200 g of single crystal silicon (silicon wafer) was added. After leaving the solution for 60 minutes, a sample wafer was etched by using the solution under the condition same as Example 7 and the contamination level of the wafer was examined as Example 7.

Figure 8:
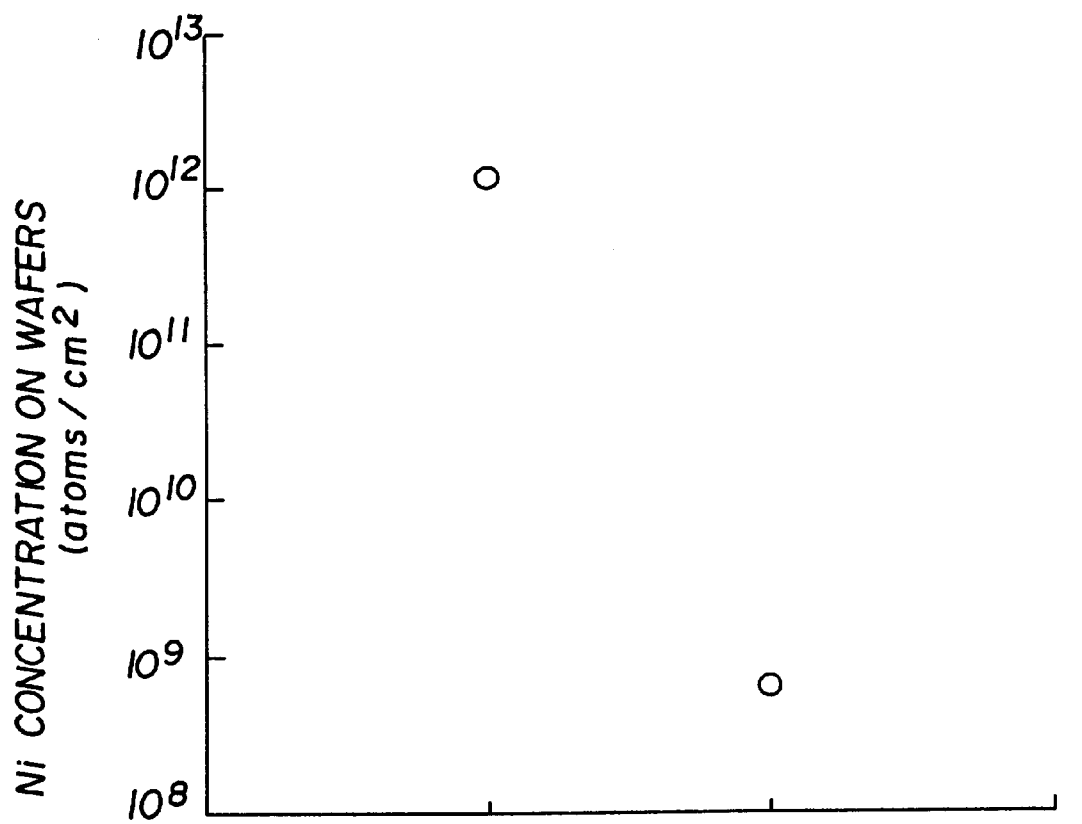
FIG. 8 is a graph showing a nickel concentration on a wafer which was etched by a sodium hydroxide solution purified with single crystal silicon in Example 8 and that on another wafer which was etched by an unpurified sodium hydroxide solution.

The result of the analysis is shown in FIG. 8 together with one obtained in the case that a sample wafer was etched with a sodium hydroxide solution without adding single crystal silicon (silicon wafer). As is apparent from the results of FIG. 8, the nickel ion concentration on the wafer etched with the sodium hydroxide solution with adding single crystal silicon (silicon wafer) was remarkably decreased.

EXAMPLE 9
(etching a wafer by a sodium hydroxide solution purified with silica)

To a sodium hydroxide solution (45%, 20 liters and 80° C.), 200 g of silica was added. After leaving the solution for 60 minutes, a sample wafer was etched by using the solution under the condition same as Example 7 and the contamination level of the wafer was examined as Example 7.

Figure 9:
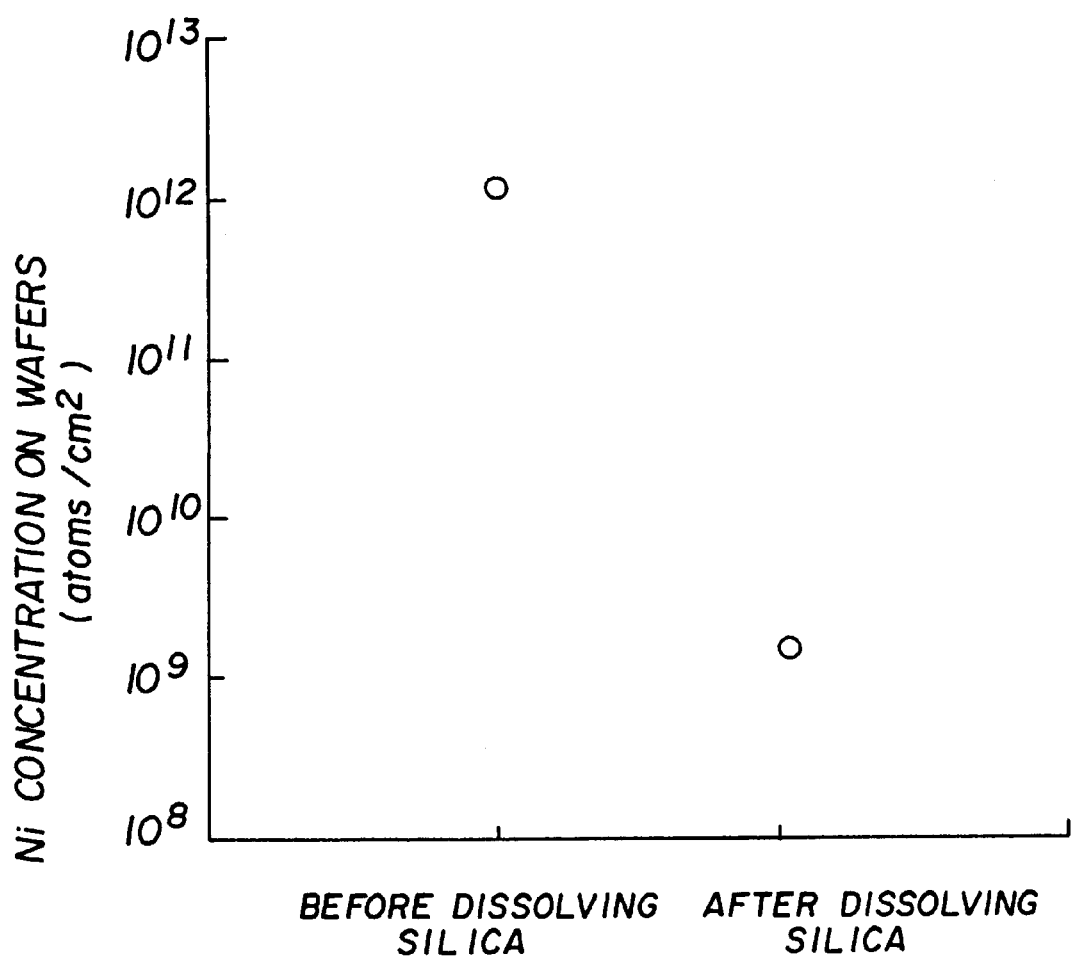
FIG. 9 is a graph showing a nickel concentration on a wafer which was etched by a sodium hydroxide solution purified with silica in Example 9 and that on another wafer which was etched by an unpurified sodium hydroxide solution.

The result of the analysis is shown in FIG. 9 together with one obtained in the case that a sample wafer was etched with a sodium hydroxide solution without adding silica. As is apparent from the results of FIG. 9, the nickel ion concentration on the wafer etched with the sodium hydroxide solution with adding silica was remarkably decreased.

Example 10
(etching a wafer by a sodium hydroxide solution purified with silicate)

Figure 10:
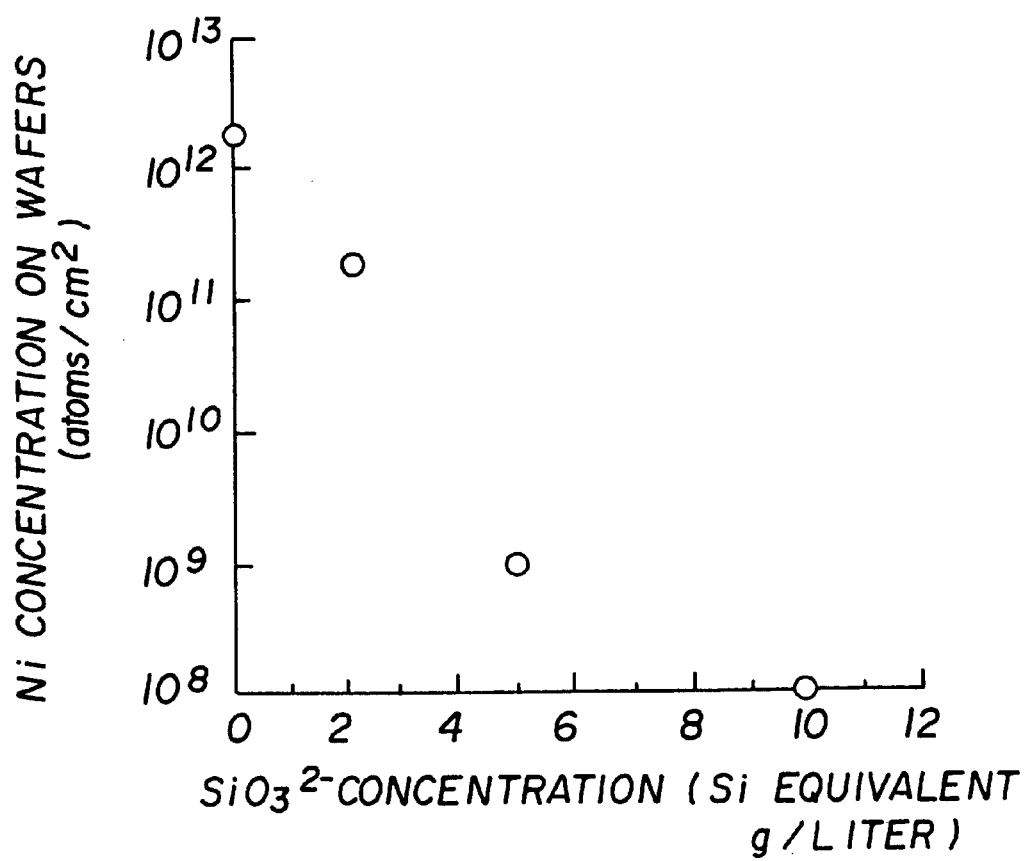
FIG. 10 is a graph showing a nickel concentration on a wafer which was etched by a sodium hydroxide solution purified with silicate in Example 10 and that on another wafer which was etched by an unpurified sodium hydroxide solution.

To a sodium hydroxide solution (45%, 2 liters and 25° C.), sodium silicate ($Na_2SiO_3$) in respective concentrations shown in FIG. 10 was added. Each sample wafer was etched by using the solution under the condition same as Example 7 and the contamination level of the wafer was examined as Example 7. The results of the analyses are shown in FIG. 10. As is apparent from the results of FIG. 10, the nickel ion concentration on the wafer etched with the sodium hydroxide solution with adding silicate was remarkably decreased as the silicate ion ($SiO_3^{2-}$) concentration in the sodium hydroxide solution goes up by adding the silicate.

EXAMPLE 11
(purification of a sodium hydroxide solution with ion-exchange resins and etching by the purified sodium hydroxide solution)

Figure 11:
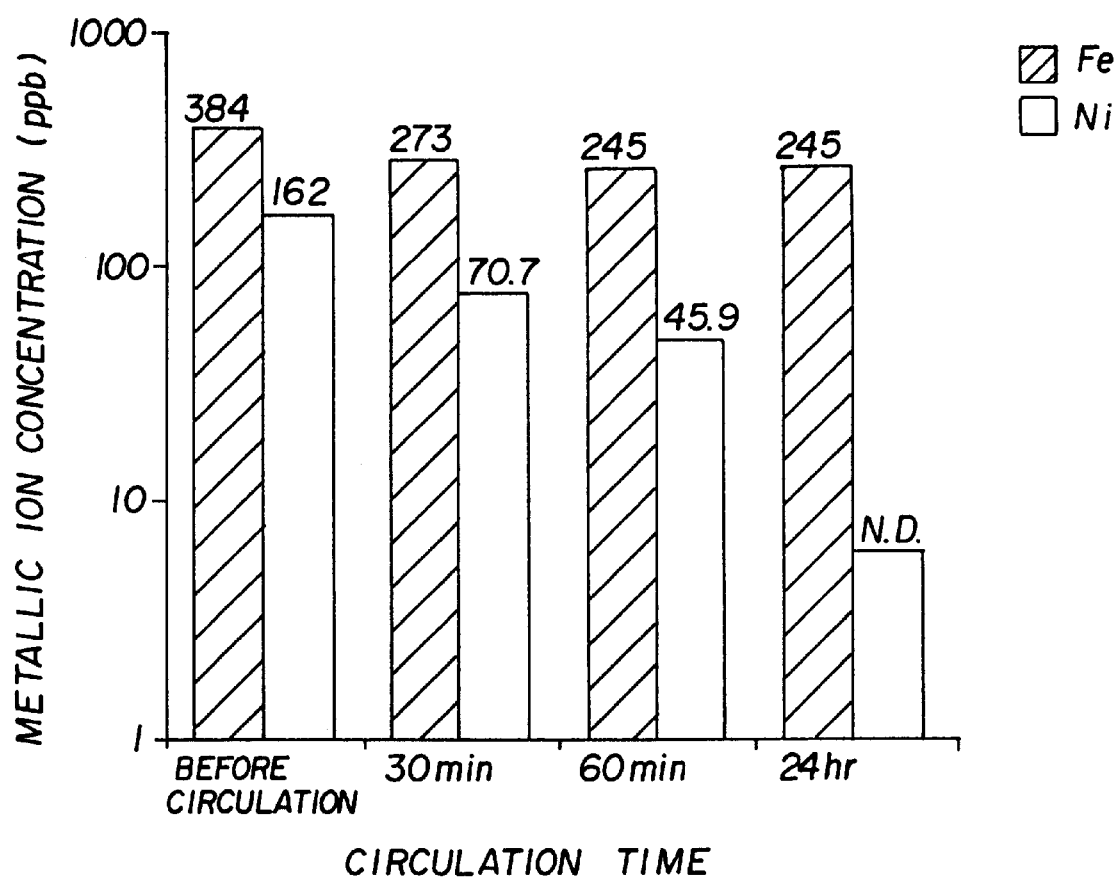
FIG. 11 is a graph showing the relation between an iron ion concentration and a nickel ion concentration in the sodium hydroxide solution and the circulation time of the sodium hydroxide solution in Example 11 where the sodium hydroxide solution was highly purified with ion exchange resins.

20 liters of a sodium hydroxide solution (45% and 25° C.) was circulated at a rate of 2 liter/minute through an ion-exchange resin (IRC-718, brand name of chelate resins made by JAPAN ORGANO Co., Ltd.) column. Before and after circulation 30 minutes later, 60 minutes later and 24 hours later, 10 ml of the sodium hydroxide solution diluted to 45 times was sampled, respectively, and then a nickel ion concentration and an iron ion concentration thereof were analyzed by an ion-exchange chromatography. The results of the analyses are shown in FIG. 11. As is apparent from the results of FIG. 11, both the iron ion concentration and the nickel ion concentration were decreased and especially the latter was excellently removed. Each sample wafer was etched by using the solution under the condition same as Example 7 and the contamination level of the wafer was examined as Example 7. The results of the examination indicated the fact that the nickel ion concentration on the wafer etched by this purified sodium hydroxide solution was remarkably decreased.

EXAMPLE 12
(the relation between Ni, Cu and Fe concentrations on an alkaline etched wafer and corresponding concentrations in a sodium hydroxide solution)

Experiment Condition:
Sample wafer; Czochralski-grown p-type, <100>-oriented, 0.005–0.010 Ωcm, 200 mm-diameter, lapped silicon wafer Alkaline etching with a sodium hydroxide solution (45% aqueous solution, 80° C. and 10 minutes)

Cleaning with water (25° C. and 3 minutes)

Cleaning with a solution of hydrochloric acid, hydrogen peroxide and water (80° C. and 3 minutes)

Cleaning with water (25° C. and 3 minutes)

Drying with IPA vapor (81.5° C. and 1 minute)

Experiment tank (common in the above treatments)
Size (mm): 280×280×300 H
Capacity: 20 liters
Material: Quart Composition of the solution of hydrochloric acid, hydrogen peroxide and water; Hydrochloric acid solution: Hydrogen peroxide water: Water=1:1:10 (volume ratio) (Use a 36 weight percent hydrochloric acid solution and a 30 weight percent hydrogen peroxide water)

Measurement of the metal impurity concentrations on the etched wafer; One side of the etched wafer was subjected to sand blasting and then thermal oxidation at 600° C. The thermal oxide film on the side of the wafer sand blasted was vapor phase decomposed with hydrofluoric acid vapor. The decomposed materials were collected by using a solution containing hydrofluoric acid. The collected materials were analyzed by ICP-MS (inductively coupled plasma mass spectrometer).

Figure 12:
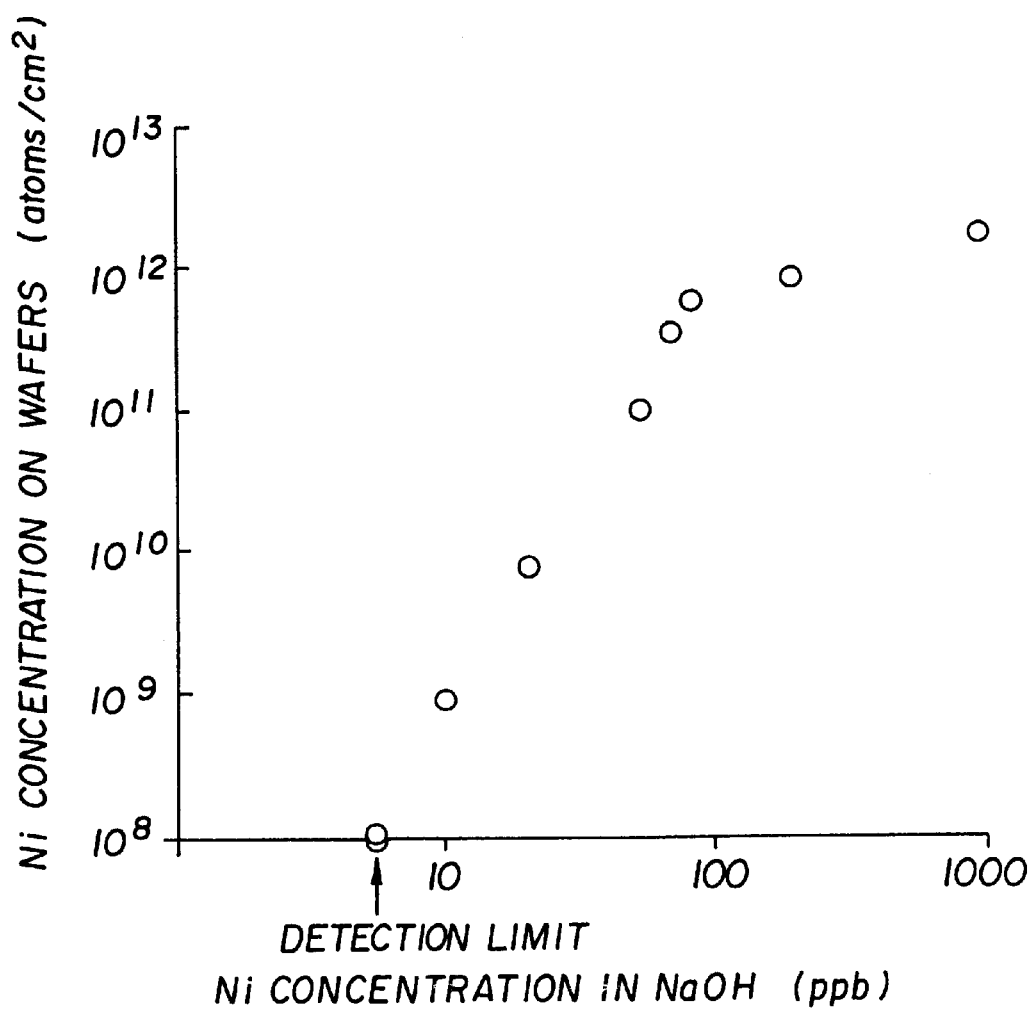
FIG. 12 is a graph showing the relation between a nickel concentration on a wafer etched by a sodium hydroxide solution and a nickel ion concentration in the sodium hydroxide solution in Example 12.
Figure 13:
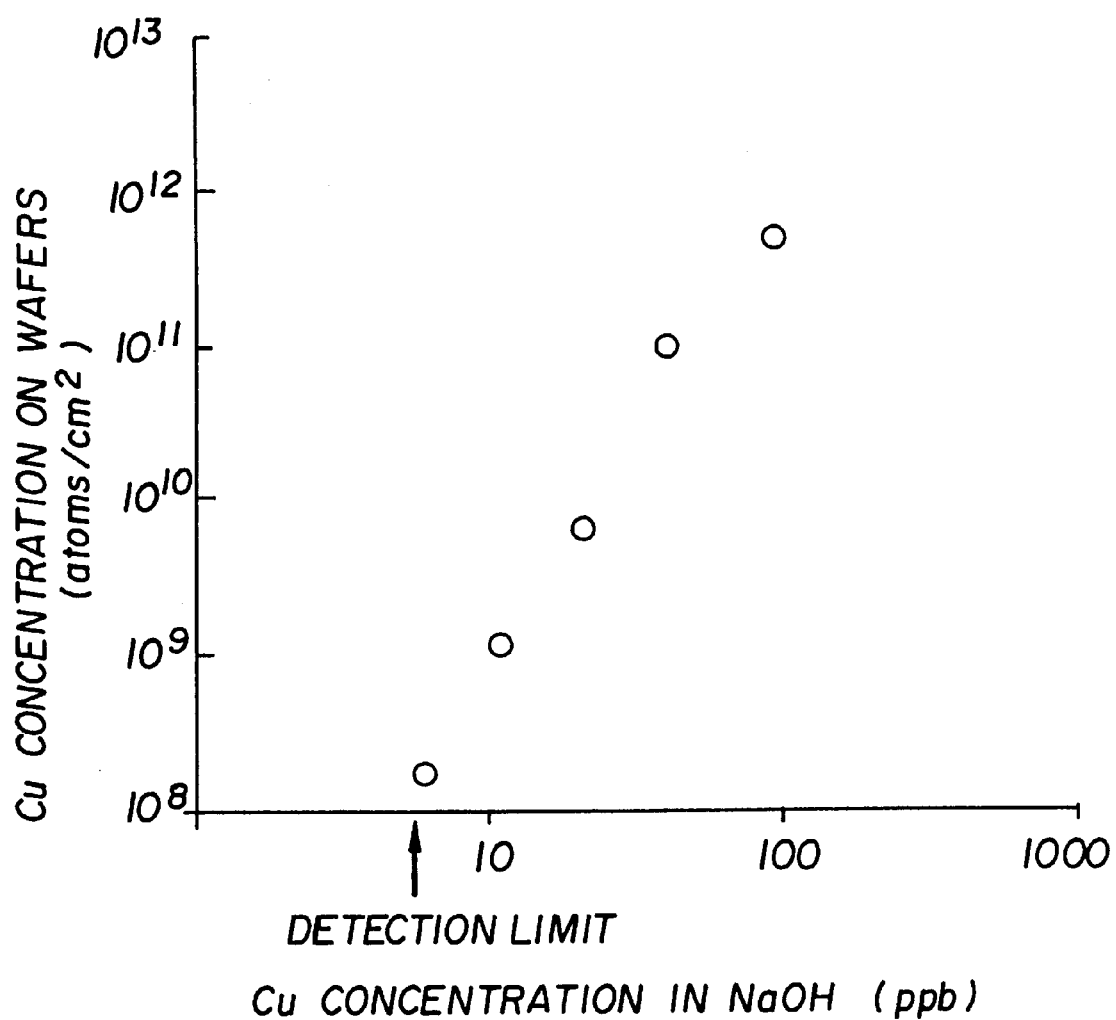
FIG. 13 is a graph showing the relation between a copper concentration on a wafer etched by a sodium hydroxide solution and a copper ion concentration in the sodium hydroxide solution in Example 12.
Figure 14:
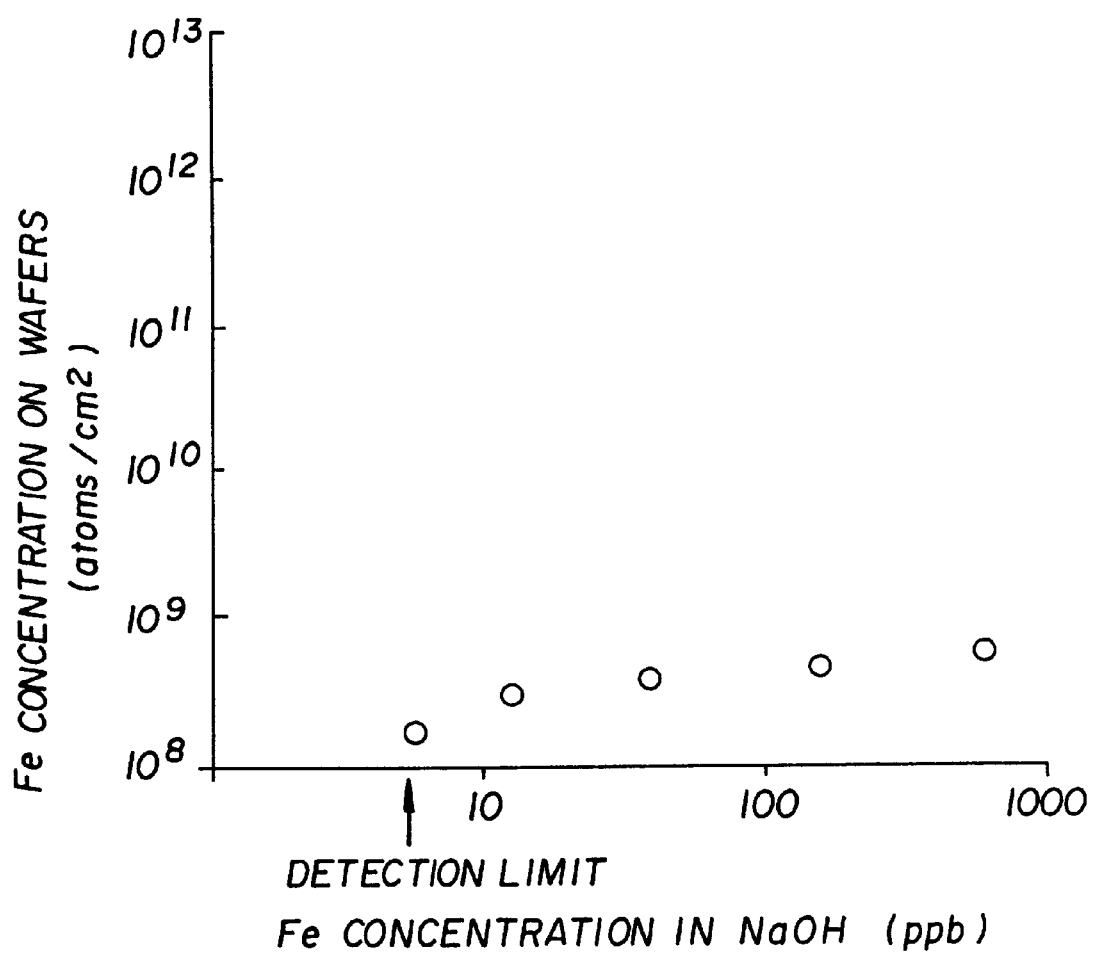
FIG. 14 is a graph showing the relation between an iron concentration on a wafer etched by a sodium hydroxide solution and an iron ion concentration in the sodium hydroxide solution in Example 12.

Measurement of the metal ion concentrations in the sodium hydroxide solution; Before etching the wafer, 10 ml of the sodium hydroxide solution diluted to 45 times was sampled and then each ion concentration thereof was analyzed by an ion-exchange chromatography. The results of the analyses are shown in FIG. 12 (Ni concentration), FIG. 13 (Cu concentration) and FIG. 14 (Fe concentration). As is apparent from the results of FIGS. 12–14, with the increase of the metallic ion concentrations in the sodium hydroxide solution, the metal concentrations on the etched wafer were increased and especially Ni and Cu concentrations were remarkably increased.

Moreover, when the metallic ion concentration in the sodium hydroxide solution becomes 10 ppb or less, it is confirmed that the metal on the wafer hardly exists, too. In addition, it is also confirmed that metallic contamination on the wafer does not become so much if the metallic ion concentration in the sodium hydroxide solution is limited to 50 ppb or less. Further, it is confirmed that the metallic ion concentration therein is preferably 20 ppb or less and more preferably 10 ppb or less.

As stated above, according to a method of purifying an alkaline solution of this invention, metallic ions (nickel, iron, copper, etc.) in the alkaline solution can be remarkably decreased at a low-cost by an easy operation. Moreover, according to a method of etching semiconductor wafers of this invention wherein an alkaline solution containing a low metallic ion concentration is used as an etching solution, the metallic contamination level due to the etching of the semiconductor wafers is greatly decreased, there being neither deterioration in the wafer quality nor deterioration in the characteristic of the semiconductor device.

Obviously, various minor changes and modifications of the present invention are possible in the light of the above teaching. It is therefore to be understood that within the scope of the appended claims, the invention may be practiced in manners other than as specifically described.

What is claimed is:

1. A method of purifying an alkaline solution containing metallic ions, prior to using said alkaline solution in an etching process, which comprises the steps of:
   (a) dissolving metallic silicon and/or silicon compounds in said alkaline solution; and
   (b) neutralizing said metalic ions in said alkaline solution with reaction products generated when the metallic silicon and/or silicon compounds are dissolved therein in an amount sufficient to create reaction products to neutralize said metallic ions.

2. A method of purifying an alkaline solution according to claim 1, wherein said metallic silicon is polysilicon and/or single crystal silicon.

3. A method of purifying an alkaline solution according to claim 1, wherein said silicon compounds are silica and/or silicates.

4. A method of purifying an alkaline solution according to claim 1, wherein the amount of said metallic silicon dissolved is 0.2 g/liter or more.

5. A method of purifying an alkaline solution according to claim 2, wherein the amount of said metallic silicon dissolved is 0.2 g/liter or more.

6. A method of purifying an alkaline solution according to claim 1, wherein the amount of Si included in the dissolved silicon compounds is 5 g/liter or more.

7. A method of purifying an alkaline solution according to claim 2, wherein the amount of Si included in the dissolved silicon compounds is 5 g/liter or more.

8. A method of purifying an alkaline solution containing metallic ions, prior to using said alkaline solution in an etching process,
   said method comprising dissolving hydrogen gas in said alkaline solution in an amount sufficient to neutralize said metallic ions.

9. A method of purifying an alkaline solution according to claim 1, wherein said alkaline solution is a sodium hydroxide solution or a potassium hydroxide solution.

10. A method of purifying an alkaline solution according to claim 8, wherein said alkaline solution is a sodium hydroxide solution or a potassium hydroxide solution.

11. A method of purifying an alkaline solution according to claim 1, wherein said metallic ions are copper ions and/or nickel ions.

12. A method of purifying an alkaline solution according to claim 8, wherein said metallic ions are copper ions and/or nickel ions.

13. A method of etching semiconductor wafers which comprises the steps of:
   (a) purifying an alkaline solution by the steps of dissolving metallic silicon and/or silicon compounds in said alkaline solution; and neutralizing said metalic ions in said alkaline solution with reaction products generated when the metallic silicon and/or silicon compounds are dissolved therein in an amount sufficient to create reaction products to neutralize said metallic ions; and
   (b) etching semiconductor wafers by using the purified alkaline solution.

14. A method of etching semiconductor wafers according to claim 13, wherein said alkaline solution is purified by dissolving metallic silicon and/or silicon compounds in said alkaline solution in an amount sufficient to create reaction products to neutralize said metallic ions.

15. A method of etching semiconductor wafers according to claim 13, wherein said alkaline solution is a sodium hydroxide solution or a potassium hydroxide solution.

16. A method of etching semiconductor wafers according to claim 13, wherein said alkaline solution is a sodium hydroxide solution or a potassium hydroxide solution.

17. A method of etching semiconductor wafers according to claim 14, wherein said alkaline solution is a sodium hydroxide solution or a potassium hydroxide solution.

18. A method of etching semiconductor wafers according to claim 13, wherein said metallic ions are copper ions and/or nickel ions.

19. A method of etching semiconductor wafers according to claim 13, wherein said metallic ions are copper ions and/or nickel ions.

20. A method of etching semiconductor wafers according to claim 14, wherein said metallic ions are copper ions and/or nickel ions.

21. A method of etching semiconductor wafers according to claim 13, wherein said metallic ion concentration in said alkaline solution used in etching the semiconductor wafers is 50 ppb or less.

22. A method of etching semiconductor wafers according to claim 13, wherein said metallic ion concentration in said alkaline solution used in etching the semiconductor wafers is 50 ppb or less.

23. A method of etching semiconductor wafers according to claim 14, wherein said metallic ion concentration in said alkaline solution used in etching the semiconductor wafers is 50 ppb or less.

24. A method of etching semiconductor wafers according to claim 13, wherein said semiconductor wafers are silicon wafers.

25. A method of etching semiconductor wafers according to claim 13, wherein said semiconductor wafers are silicon wafers.

26. A method of etching semiconductor wafers according to claim 14, wherein said semiconductor wafers are silicon wafers.

* * * * *